United States Patent [19]

Bonstead et al.

[11] Patent Number: 4,846,522
[45] Date of Patent: Jul. 11, 1989

[54] EXTRUDED BUG AND GRAVEL SHIELD

[75] Inventors: Douglas L. Bonstead, Ankeny; Ronald D. Mastin, Allerton; Carl W. Langren, Des Moines, all of Iowa

[73] Assignee: Deflecta-Shield Corporation, West Des Moines, Iowa

[21] Appl. No.: 207,841

[22] Filed: Jun. 17, 1988

[51] Int. Cl.$^4$ ................................................ B60J 1/20
[52] U.S. Cl. .................................... 296/91; 296/180.2; 296/78.1
[58] Field of Search .................... 296/91, 78.1, 180.1, 296/180.2; 98/2.12

[56] References Cited

U.S. PATENT DOCUMENTS

| | | | |
|---|---|---|---|
| 3,015,517 | 1/1962 | Thornburgh | 296/91 |
| 4,153,129 | 5/1979 | Redmond | 296/91 |
| 4,471,991 | 9/1984 | Mattias | 296/91 |
| 4,627,657 | 12/1986 | Daniel et al. | 296/91 |

Primary Examiner—Robert R. Song
Attorney, Agent, or Firm—Dykema Gossett

[57] ABSTRACT

A single piece bug and gravel shield which avoids use of an elongated channel extrusion bracket for mounting, with the shield being a single-piece, transparent polymeric material having an upper shield deflecting portion joined at a shoulder to a thicker lower base portion, with the shield being a transparent flexible polymeric plastic material and further having structure for attaching the base portion to the front edge of a vehicle to deflect air current up and over the vehicle.

8 Claims, 1 Drawing Sheet

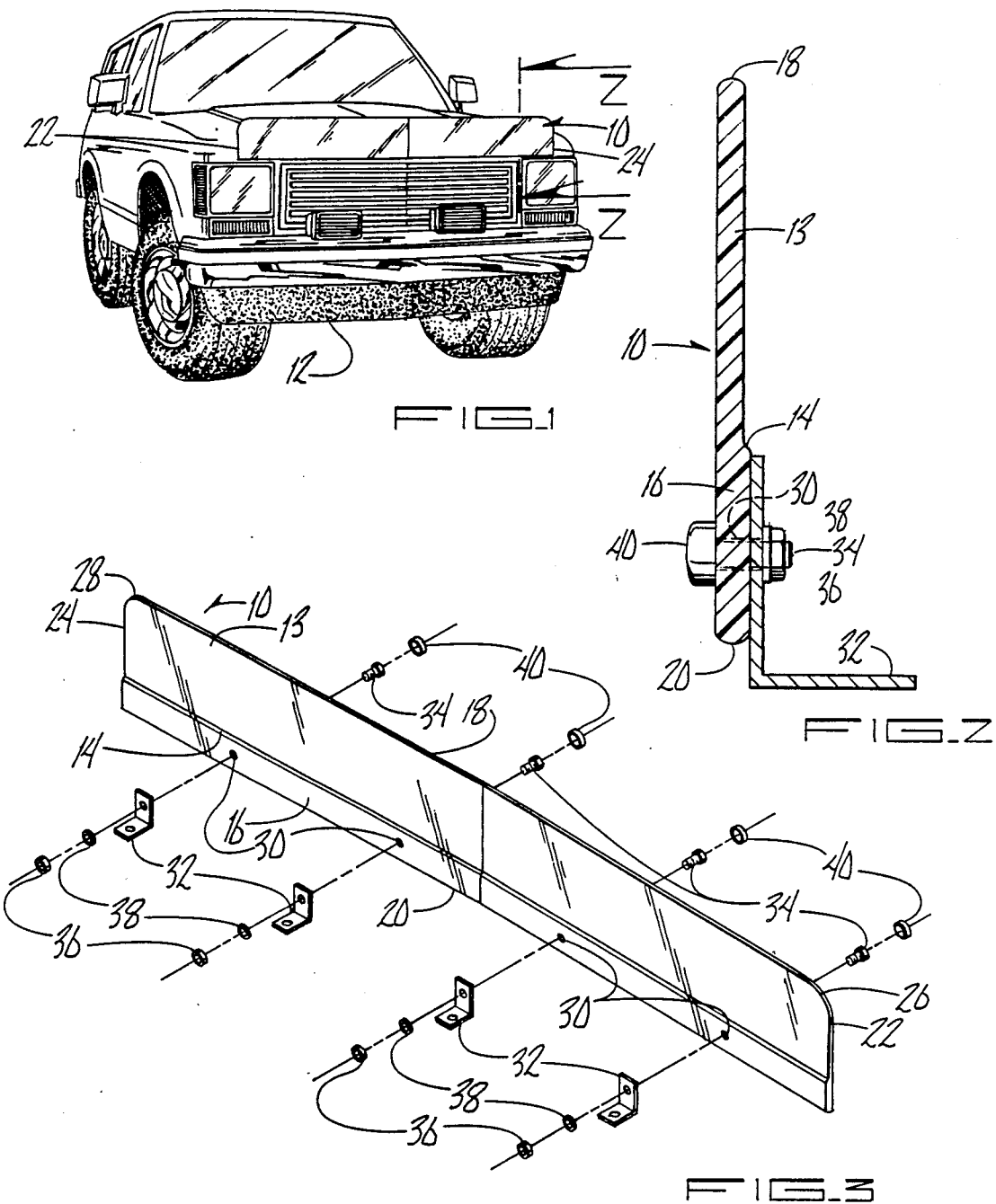

EXTRUDED BUG AND GRAVEL SHIELD

BACKGROUND OF THE INVENTION

This invention relates generally to automotive accessories. More specifically, it relates to air current deflectors, commonly referred to as bug and gravel shields, which may be detachably attached to the front edge portion of an automobile, generally along the front edge of a vehicle.

By way of background, bug and gravel shields for vehicles have been known before as represented by earlier issued, commonly owned patents: Thornburgh U.S. Pat. No. 3,015,517 issued Jan. 2, 1962; Redmond U.S. Pat. No. 4,153,129 issued May 8, 1979; and Williams et al U.S. Pat. No. 4,518,191 issued May 21, 1985. Other patents on bug and gravel shields include: U.S. Pat. No. 2,872,242 issued Feb. 3, 1959; U.S. Pat. No. 3,281,181 issued Oct. 25, 1966; and U.S. Pat. No. 3,329,150 issued July 4, 1967. There are, of course, numerous other patents that relate to bug and gravel shields.

As far as Applicants are aware, it is common to all of the bug and gravel shield prior art, as conveniently illustrated by the prior issued commonly-owned Thornburgh Pat. No. 3,015,517 and Redmond Pat. No. 4,153,129, to comprise three basic portions. Those portions include the shield itself, an extrusion channel which dwells along the lower edge of the shield and holds the shield, and an attaching bracket for the shield. The use of extrusion channels, while it makes attachment directly to the vehicle convenient, has certain disadvantages. Amongst those disadvantages are expense, the labor involved in inserting the shield into the extrusion channel opening, and of course the increased cost of manufacture by use of an extrusion channel holder. It would, therefore, be desirable to eliminate the holding extrusion channel which dwells along the lower edge of the shield.

In the past, it was thought necessary for the extrusion channel to be a part of the overall bug and gravel shield unit in order to preserve the integrity of the unit from cracking, in order to better allow mounting of the unit, and in order to allow the unit to be bent to conform to the front edge of a vehicle. Typically, the shields used in the past were all of a constant cross-sectional thickness.

It has now been discovered that a single piece, integrally formed shield can be made which avoids the use of an extrusion channel bracket member, providing that the shield has a proper cross-sectional configuration as hereinafter defined, and providing that the shield is made of certain preselected plastic materials.

It is accordingly the primary objective of the present invention to prepare a single piece, integrally formed bug and gravel shield which will function as effectively as aluminum channel extrusion-held shields, but which employs no channel and thus has significantly increased cost effectiveness compared to extrusion channel held shields and at the same time provides each of the benefits and advantages thereof.

The method and means of accomplishing the primary objective of the invention as well as others will be apparent from the detailed description which follows hereinafter.

SUMMARY OF THE INVENTION

This invention relates to a bug and gravel shield which is formed as a single piece integral unit. It can be mounted directly to the front edge of the hood of a vehicle without the use of any elongated channel extrusion bracket. The shield is comprised of a transparent flexible polymeric plastic material having an upper shield deflecting portion integrally joined at a shoulder to a thicker, lower base portion. The shield additionally has means for attaching the base portion to the front end of the vehicle to deflect air current up and over the vehicle. The flexible polymeric plastic material is preferably an acrylic or a polycarbonate.

BRIEF DESCRIPTION OF THE DRAWING

The various features, objects, benefits, and advantages of the present invention will become more apparent upon reading the following detailed description of the preferred embodiment along with the appended claims in conjunction with the drawing, wherein:

FIG. 1 is a perspective view of a vehicle having attached thereto the bug and gravel shield made in accordance with the present invention;

FIG. 2 is a side elevational view of the bug and gravel shield, partly in cross-section; and FIG. 3 is a perspective assembly view of the bug and gravel shield made in accordance with the teachings of the present invention.

DETAILED DESCRIPTION OF THE INVENTION

The bug and gravel shield of this invention, generally depicted at 10 is adapted for mounting to the front edge portion of a vehicle 12, across the same generally at the front edge of the hood for deflecting air currents up and over the hood, and the windshield of the vehicle.

The shield 10 is comprised of an upper shield deflecting portion 13 which has a top edge 18, with the upper shield deflecting portion 13 integrally joined at a shoulder 14 to a base portion 16. Base portion 16 has a bottom edge 20 which dwells in a lower plane that is generally parallel to the front edge of the hood of a vehicle, when the bug and gravel shield is attached to the vehicle.

It has been found important that top edge 18 and bottom edge 20 be crowned, or generally rounded in shape, as opposed to flat and having sharp corners. The reason for this is that when the edges are crowned, as best depicted in the cross-section of FIG. 2, the shield has a markedly decreased tendency for cracking during mounting or usage. It is also important that shoulder 14 be rounded or crowned as best depicted in FIG. 2 for a similar reason. Further, when the top edge 18 and bottom edge 20 are crowned, a more aerodynamic structure is provided.

Also as best seen in FIG. 2, base portion 16 is of thicker or wider cross-section than the upper shield portion 13. Generally, base portion 16 should be about 50% to about 75% thicker or wider in transverse cross-section than the shield portion 13 and most preferably is from about 55% to about 65% wider. When these percentage ratios of thickness are maintained, it is found that the shield is both simultaneously satisfactorily flexible and yet satisfactorily durable for mounting to minimize cracking.

The shield 10 has a pair of opposing side edges 22 and 24 which join top edge 18 by rounded shoulders 26 and 28.

The shield 10, as earlier mentioned, is made of a single piece, preferably extruded shield member which is comprised of a transparent, flexible polymeric plastic material. Suitable plastic materials are known to those of ordinary skill in the art, but certain plastic materials have been found most preferably for use in preparing the shields for this invention which do not use any elongated channel extrusion bracket for holding the bottom or lower edge portion 20 of the shield.

The preferred flexible polymeric plastic materials for this invention are acrylics and polycarbonates. However, it should be understood that other transparent flexible materials can be used such as substituted styrenes, modified styrenes, and $C_1$ to $C_5$ polyalpha olefins and copolymers thereof. Particularly preferred polyolefins are polyethylenes and polypropylenes. In addition, for copolymers either impact copolymers or random copolymers, particularly of polypropylene, may be used as well.

The shield itself has a plurality of apertures 30 for attachment of holding brackets 32 via bolts 34, lock washers 38 and nuts 36. As depicted in FIG. 3, the heads of the bolts 34 are preferably covered with snap-on caps 40.

In use, the unit is found to function just as effectively as extrusion channel held shields. Moreover, it has sufficient flexibility that it can conform to the front edge portion of the hood of a variety of different vehicles by slight bending. There is not a sharp midpoint bend to this unit as is often the case with other units held in an aluminum extrusion channel, the bend instead being generally mild and only slightly arcuate.

The unit itself has been found durable, particularly where all of the edges and shoulders are crowned and where the thickness diameter of the upper shield portion in comparison with the lower base portion is maintained as earlier expressed. The unit is easier to manufacture, does not have to be inserted in an aluminum extrusion channel, avoids the use of an aluminum extrusion channel, and has no worse record of incidences of breakage either during manufacture or mounting than aluminum extrusion channel held units. It obviously is cheaper to manufacture, less labor intensive in manufacture, and can be manufactured more quickly and expediently.

It, therefore, can be seen that the invention accomplishes at least all of its stated objectives.

What is claimed is:

1. A bug and gravel shield which is formed as a single piece integral unit and which is mounted without use of any elongated channel extrusion bracket, comprising:

a single piece, extruded shield member for attachment along a front edge of a hood of a vehicle;

said shield member being comprised of a transparent flexible polymeric plastic material having an upper shield deflecting portion integrally joined at a shoulder to a thicker lower base portion; and means for attaching said thicker base portion to the front edge of a vehicle to deflect air current up and over the vehicle.

2. The bug and gravel shield of claim 1 wherein the single piece extruded shield has a top edge, bottom edge, and side edges, each of said side edges joined to the top edge by a generally rounded shoulder.

3. The bug and gravel shield of claim 2 wherein the top and bottom edges are rounded or crowned.

4. The bug and gravel shield of claim 1 wherein the shield member has a plurality of apertures along said lower base portion for attachment to a vehicle by holding bracket means.

5. The bug and gravel shield of claim 4 wherein the holding bracket means is a plurality of bolts and brackets, with said bolts having exterior snapon caps.

6. The bug and gravel shield of claim 1 wherein the transparent polymeric plastic material is an extrudable, heat settable polymeric resin selected from the group consisting of acrylics, polycarbonates, substituted styrenes, modified styrenes, $C_1$ to $C_5$ poly alpha-olefins, and copolymers thereof.

7. The bug and gravel shield of claim 1 wherein the transverse cross-section of the base portion is from about 50% to about 75% greater than the transverse cross-section of the upper shield portion.

8. The bug and gravel shield of claim 1 wherein the transverse cross-section of the base portion is from about 55% to about 65% greater than the transverse cross-section of the upper shield portion.

* * * * *